United States Patent
Cheng

(10) Patent No.: US 9,620,019 B1
(45) Date of Patent: Apr. 11, 2017

(54) METHODS AND SYSTEMS FOR FACILITATING VEHICLE LANE CHANGE

(71) Applicants: DENSO International America, Inc., Southfield, MI (US); DENSO CORPORATION, Kariya-shi, Aichi-ken (JP)

(72) Inventor: Mengxue Cheng, Farmington Hills, MI (US)

(73) Assignees: Denso International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/931,370

(22) Filed: Nov. 3, 2015

(51) Int. Cl.
| | | |
|---|---|---|
| *B62D 11/00* | (2006.01) | |
| *B60Q 1/00* | (2006.01) | |
| *H04N 7/18* | (2006.01) | |
| *G08G 1/16* | (2006.01) | |
| *B62D 15/02* | (2006.01) | |
| *B60Q 9/00* | (2006.01) | |
| *G01S 19/13* | (2010.01) | |

(52) U.S. Cl.
CPC .............. *G08G 1/167* (2013.01); *B60Q 9/008* (2013.01); *B62D 15/0265* (2013.01); *G01S 19/13* (2013.01)

(58) Field of Classification Search
USPC .............................. 701/41; 340/435; 348/148
See application file for complete search history.

(56) References Cited

U.S. PATENT DOCUMENTS

| | | | |
|---|---|---|---|
| 6,737,964 B2 | 5/2004 | Samman et al. | |
| 9,230,183 B2* | 1/2016 | Bechtel | |
| 2002/0005778 A1* | 1/2002 | Breed | B60Q 9/008 340/435 |
| 2004/0148063 A1* | 7/2004 | Patchell | B60T 17/22 701/1 |
| 2004/0246112 A1* | 12/2004 | Strumolo | B60Q 9/008 340/435 |
| 2008/0040004 A1* | 2/2008 | Breed | B60R 21/0134 701/45 |

(Continued)

FOREIGN PATENT DOCUMENTS

| | | |
|---|---|---|
| CN | 103264663 A | 8/2013 |
| CN | 103587524 A | 2/2014 |

*Primary Examiner* — Tyler Paige
(74) *Attorney, Agent, or Firm* — Harness, Dickey & Pierce, P.L.C.

(57) ABSTRACT

A method for informing a driver of a subject vehicle that the subject vehicle and a secondary vehicle may be entering a target lane between the vehicles from opposite sides of the target lane. The method includes identifying location of the subject vehicle relative to the secondary vehicle when the subject vehicle and the secondary vehicle are on opposite sides of the target lane, and when at least one of the subject vehicle and the secondary vehicle is moving into the target lane. The method also includes alerting the driver of the subject vehicle of the secondary vehicle when the subject vehicle and the secondary vehicle are on opposite sides of the target lane, and when a gap between the subject vehicle and the secondary vehicle is decreasing. The method further includes steering the subject vehicle away from the secondary vehicle if the gap is less than a predetermined distance.

21 Claims, 2 Drawing Sheets

(56) References Cited

U.S. PATENT DOCUMENTS

Figure 1:
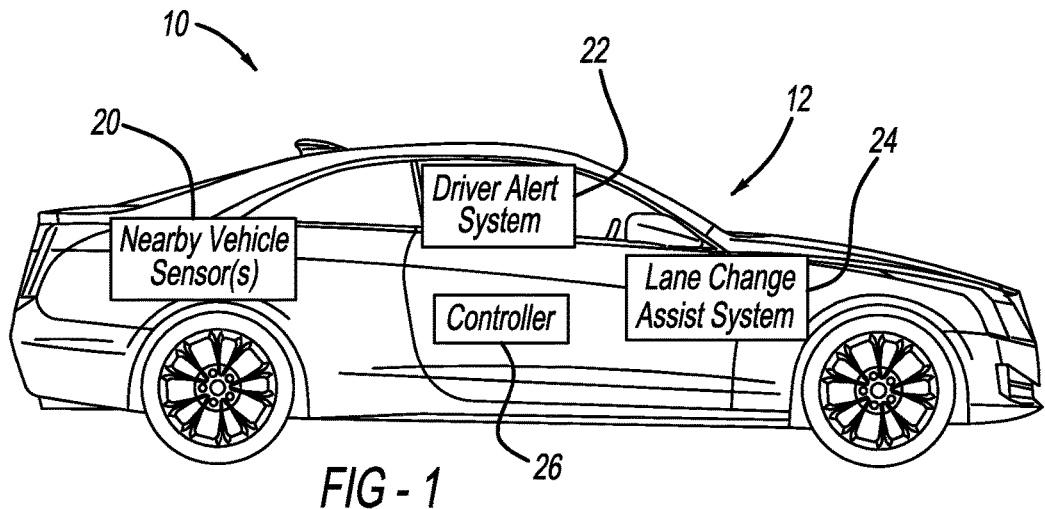

| | | | | |
|---|---|---|---|---|
| 2008/0300755 | A1* | 12/2008 | Madau | B60R 1/00 701/49 |
| 2009/0045928 | A1* | 2/2009 | Rao | B60Q 9/006 340/435 |
| 2009/0243822 | A1* | 10/2009 | Hinninger | B60Q 9/008 340/435 |
| 2010/0194593 | A1* | 8/2010 | Mays | B60Q 5/006 340/905 |
| 2011/0196568 | A1* | 8/2011 | Nickolaou | B60W 30/0953 701/31.4 |
| 2011/0251768 | A1* | 10/2011 | Luo | B60W 30/12 701/70 |
| 2013/0015089 | A1 | 1/2013 | McLaughlin | |
| 2013/0057427 | A1* | 3/2013 | Haberland | G01S 7/4021 342/165 |
| 2013/0181860 | A1* | 7/2013 | Le | G01S 13/931 342/72 |
| 2013/0241182 | A1* | 9/2013 | Rao | B60R 21/0134 280/735 |
| 2014/0049646 | A1* | 2/2014 | Nix | B60R 1/002 348/148 |
| 2014/0067206 | A1* | 3/2014 | Pflug | B60W 10/04 701/41 |
| 2014/0350836 | A1* | 11/2014 | Stettner | G01S 17/023 701/301 |
| 2015/0127190 | A1* | 5/2015 | Fuehrer | B60W 30/09 701/1 |
| 2015/0194057 | A1* | 7/2015 | Jin | G08G 1/167 348/148 |
| 2015/0314730 | A1* | 11/2015 | An | G06T 3/00 348/148 |
| 2015/0321699 | A1* | 11/2015 | Rebhan | B60Q 9/00 701/23 |
| 2016/0068143 | A1* | 3/2016 | Schanz | B62D 6/001 701/70 |
| 2016/0196748 | A1* | 7/2016 | Yellambalase | B60R 11/04 340/435 |

* cited by examiner

METHODS AND SYSTEMS FOR FACILITATING VEHICLE LANE CHANGE

FIELD

The present disclosure relates to methods and systems for facilitating vehicle lane changes, such as when two vehicles move towards one another into a lane between the two vehicles.

BACKGROUND

This section provides background information related to the present disclosure, which is not necessarily prior art.

Although systems exist for helping a driver locate a vehicle in his or her blind spot, and to generally assist with collision avoidance, such system are subject to improvement. The present teachings advantageously provide systems and methods for informing a driver that another vehicle may be attempting to enter the same lane as the driver, but from a side of the lane opposite to the driver. The present teachings provide for improved collision avoidance systems and methods as well.

SUMMARY

This section provides a general summary of the disclosure, and is not a comprehensive disclosure of its full scope or all of its features.

The present teachings provide for a method for informing a driver of a subject vehicle that the subject vehicle and a secondary vehicle may be entering a target lane between the subject vehicle and the secondary vehicle from opposite sides of the target lane. The method includes identifying location of the subject vehicle relative to the secondary vehicle when the subject vehicle and the secondary vehicle are on opposite sides of the target lane, and when at least one of the subject vehicle and the secondary vehicle is moving into the target lane. The method also includes alerting the driver of the subject vehicle of the secondary vehicle when the subject vehicle and the secondary vehicle are on opposite sides of the target lane, and when a gap between the subject vehicle and the secondary vehicle is decreasing. The method further includes steering the subject vehicle away from the secondary vehicle if the gap is less than a predetermined distance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 2:
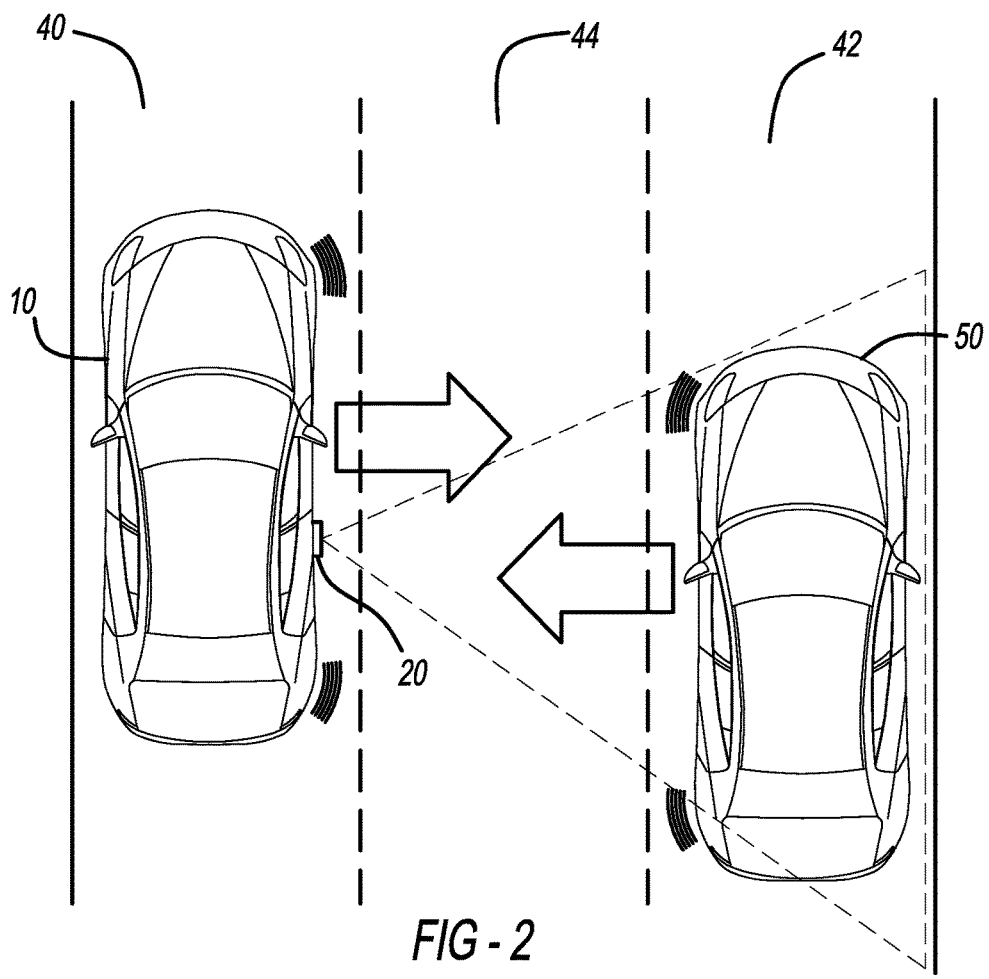
Figure 3:
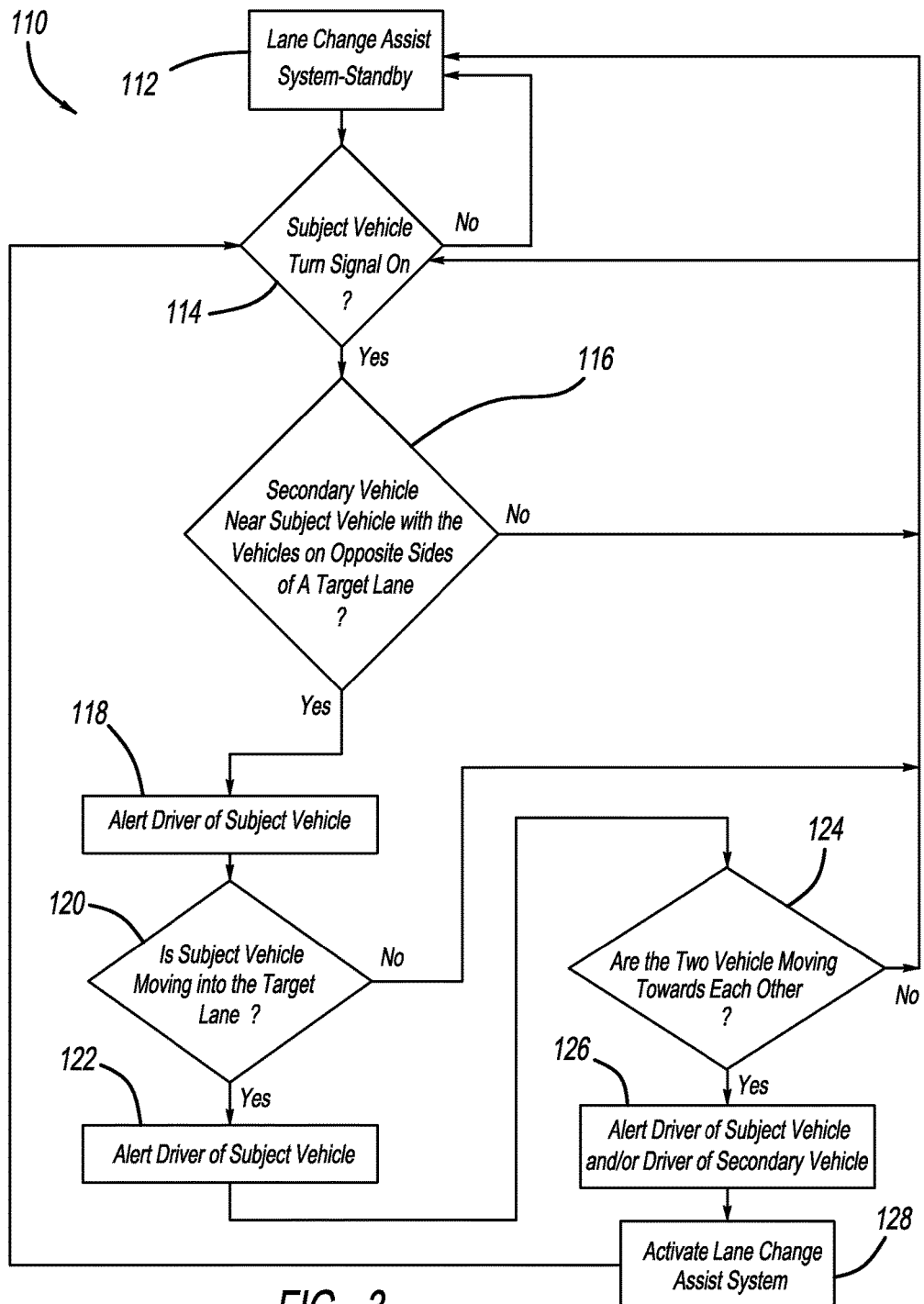

FIG. 1 illustrates a subject vehicle including a system according to the present teachings for informing a driver of the subject vehicle that the subject vehicle and a secondary vehicle may be entering a target lane between the vehicles from opposite sides of the target lane;

FIG. 2 is a schematic of the subject vehicle and a second vehicle on opposite sides of the target lane prior to either one of the vehicles entering the target lane; and FIG. 3 illustrates a method according to the present teachings for informing the driver of the subject vehicle that the subject vehicle and the secondary vehicle may be entering a target lane between the subject vehicle and the secondary vehicle from opposite sides of the target lane.

Corresponding reference numerals indicate corresponding parts throughout the several views of the drawings.

DETAILED DESCRIPTION

Example embodiments will now be described more fully with reference to the accompanying drawings.

With initial reference to FIGS. 1 and 2, a vehicle 10 including a system 12 according to the present teachings is illustrated. Although the vehicle 10 is illustrated as an automobile in exemplary FIG. 1, the present teachings apply to any other suitable vehicle, such as a sport utility vehicle (SUV), a mass transit vehicle (such as a bus), or a military vehicle, for example. The system 12 is configured to inform a driver of the vehicle 10 (often referred to herein as the subject vehicle) that the subject vehicle 10 within first lane 40 and a secondary vehicle 50 within second lane 42 may be entering a target lane 44 between the vehicles 10 and 50 from opposite sides of the target lane 44. The system 12 generally includes one or more nearby vehicle sensors 20, a driver alert system 22, a lane change assist system 24, and a controller 26. The controller 26 can be any suitable controller for controlling one or more of the nearby vehicle sensors 20, the driver alert system 22, and/or the lane change assist system 24. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

The nearby vehicle sensors 20 include one or more sensors configured to identify location of vehicles in the second lane 42 and the target lane 44 relative to the subject vehicle 10. The nearby vehicle sensors 20 can include any suitable sensors, such as any suitable camera, radar, or any other suitable sensor. The nearby vehicle sensors 20 can be mounted at any suitable position on the vehicle 10, such as along the sides thereof. GPS coordinates identifying the location of vehicles in the second lane 42 and the target lane 44, as well as GPS coordinates identifying location of the subject vehicle 10, can also be used.

The driver alert system 22 is configured to alert the driver of the subject vehicle 10 of the presence of the secondary vehicle 50, as well as the position of the secondary vehicle 50 relative to the subject vehicle 10. The driver alert system 22 can also be configured to generate an alert that informs the driver of the subject vehicle 10 when the turn signal of the secondary vehicle 50 has been activated so as to indicate that the secondary vehicle 50 intends to enter the target lane 44. The driver alert system 22 can be configured to provide any suitable alert to the driver of the subject vehicle 10. For example, the driver alert system 22 can be configured to provide any suitable visual alert, audible alert, and/or haptic feedback alert. For example, the visual alert can be displayed to the driver on a heads-up display of the subject vehicle 10, on a center stack display of the subject vehicle 10, at the instrument cluster of the subject vehicle 10, etc. The audible alert can be any suitable alert tone, voice alert, etc. The haptic feedback alert can be provided in any suitable manner. For example, the haptic feedback alert can be provided at the steering wheel and/or the driver's seat.

The lane change assist system 24 is configured to direct the subject vehicle 10 away from the secondary vehicle 50, such as when both the subject vehicle 10 and the secondary vehicle 50 are both entering the target lane 44 from opposite sides of the target lane 44. The lane change assist system 24 can be configured to direct the subject vehicle 10 away from the secondary vehicle 50 in any suitable manner. For example, the lane change assist system 24 can be configured to steer the subject vehicle 10 away from the secondary vehicle 50, decelerate the subject vehicle 10 to give the driver of the subject vehicle 10 additional time to avoid the secondary vehicle 50, and/or selectively break wheels of the subject vehicle 10 in order to direct the subject vehicle 10 away from the secondary vehicle 50.

With continued reference to FIGS. 1 and 2, and additional reference to FIG. 3, a method according to the present teachings is illustrated at reference numeral 110. The method 110 is configured to inform a driver of the subject vehicle 10 that the subject vehicle 10 and the secondary vehicle 50 are entering the target lane 44 from opposite sides of the target lane 44. The method 110 can be performed by the controller 26, or any other suitable control device.

With initial reference to block 112 of the method 110, the lane change assist system 24 is placed on standby. With reference to block 114, if a turn signal of the subject vehicle 10 is activated indicating that the subject vehicle 10 tends to enter the target lane 44, the method 110 proceeds to block 116. If this turn signal is not activated, the method 110 returns to block 112, where the lane change assist system 24 remains on standby. Block 114 is optional, and thus the method 110 can proceed to block 116 even if this turn signal of the subject vehicle 10 is not activated, so as to account for situations where the driver of the subject vehicle 10 may enter the target lane 44 without activating the turn signal of the subject vehicle 10. Furthermore, block 114 can include determining whether the turn signal of the secondary vehicle 50 is activated in addition to, or instead of, determining whether the turn signal of the subject vehicle 10 is activated. If the turn signal of the secondary vehicle 50 is activated indicating intent to enter the target lane 44, the method 110 can proceed to block 116 and the driver of the subject vehicle 10 can be alerted by the driver alert system 22. If the turn signal of the secondary vehicle 50 is not activated, the method can return to block 112.

At block 116, the nearby vehicle sensors 20 scan across the target lane 44 to the second lane 42 to determine if any vehicles are present in the second lane 42. If no vehicle is detected in the second lane 42, the method returns to block 114 or block 112. If a vehicle is detected in the second lane 42, such as the secondary vehicle 50 for example, the method 110 proceeds to block 118, where the driver alert system 22 notifies the driver of the subject vehicle 10 in any suitable manner that the secondary vehicle 50 is present in the second lane 42. The method 110 can also proceed to block 118 if, based on GPS coordinates of the subject vehicle 10 and vehicles proximate to the subject vehicle 10, it is determined that a vehicle, such as the secondary vehicle 50, is near the subject vehicle 10 on an opposite side of the target lane 44.

From block 118 the method 110 proceeds to block 120. At block 120, whether or not the subject vehicle 10 is moving into the target lane 44 is determined in any suitable manner. For example, the nearby vehicle sensors 20 can include a camera configured to determine the position of the subject vehicle 10 relative to the target lane 44. GPS coordinates of the subject vehicle 10 can also be used to determine if the subject 10 is moving into the target lane 44. If the subject vehicle 10 is not moving into the target lane 44, the method returns to block 112, where the lane change assist system 24 remains on standby, or block 114. If the subject vehicle 10 is moving into the target lane 44, the method 110 proceeds to block 122. At block 122, the driver alert system 22 notifies the driver in any suitable manner that the subject vehicle is moving into the target lane 44.

From block 122 the method 110 proceeds to block 124. At block 124, whether or not the subject vehicle 10 and the secondary vehicle 50 are moving towards each other into the target lane 44 is determined in any suitable manner. For example, the vehicles 10 and 50 will be determined to be moving towards one another when the nearby vehicle sensors 20 detect that a gap between the vehicles 10 and 50 is decreasing. GPS coordinates of the vehicles 10 and 50 can also be used to determine if the vehicles 10 and 50 are moving towards one another. If the subject vehicle 10 and the secondary vehicle 50 are not moving towards each other into the target lane 44, the method 110 returns to block 112 or block 114. If the subject vehicle 10 and the secondary vehicle 50 are determined to be moving towards each other, the method proceeds to block 126. At block 126, the driver alert system 22 notifies the driver of the subject vehicle 10 in any suitable manner that the vehicles 10 and 50 are moving towards each other.

The present teachings further provide for a secondary alert system, which may be included in the secondary vehicle 50. The secondary alert system may be any suitable alert system of the secondary vehicle 50 configured to alert a driver of the secondary vehicle 50 of the primary vehicle and the positions of the subject vehicle 10 and the secondary vehicle 50. The secondary alert system can be any suitable audible, visual, and/or haptic feedback alert. At block 126, the secondary alert system can be activated when a gap between the subject vehicle 10 and the secondary vehicle 50 decreases to less than a predetermined distance. A controller of the secondary vehicle 50 can activate the secondary alert system, or the controller 26 can transmit a signal to the secondary vehicle 50 requesting that the secondary alert system generate the alert.

From block 126, the method 110 proceeds to block 128. At block 128 the lane change assist system 24 is activated, such as by the controller 26. The lane change assist system 24 directs the subject vehicle 10 away from the secondary vehicle 50 as described above in order to reduce any possibility of a collision between the subject vehicle 10 and the secondary vehicle 50. The lane change assist system 24 can be activated when a gap between the subject vehicle 10 and the secondary vehicle 50, as measured by the nearby vehicle sensors 20 for example, decreases to less than a predetermined distance. Block 126 can also be configured such that the driver alert system 22 is only activated when the gap decreases to less than the predetermined distance.

The present teachings thus advantageously provide for methods and systems for informing a driver of the subject vehicle 10 of the presence of secondary vehicle 50, even though the secondary vehicle 50 is not in the target lane 44 directly adjacent to the first lane 40 that the subject vehicle 10 is in, but rather in the second lane 42. The second lane 42 is on a side of the target lane 44 opposite to the first lane 40, such that the target lane 44 is between the first lane 40 and the second lane 42.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for informing a driver of a subject vehicle that the subject vehicle and a secondary vehicle may be entering a target lane between the subject vehicle and the secondary vehicle from opposite sides of the target lane, the method comprising:

identifying a location of the subject vehicle relative to the secondary vehicle using a sensor when the subject vehicle and the secondary vehicle are on opposite sides of the target lane, and when at least one of the subject vehicle and the secondary vehicle is moving into the target lane;

alerting the driver of the subject vehicle of the secondary vehicle using a controller when the subject vehicle and the secondary vehicle are on opposite sides of the target lane, and when a gap between the subject vehicle and the secondary vehicle is decreasing; and alerting the driver of the subject vehicle that a turn signal of the secondary vehicle has been activated, the turn signal indicating an intent of the secondary vehicle to enter the target lane.

2. The method of claim 1, further comprising identifying the location of the subject vehicle relative to the secondary vehicle with a sensor mounted to the subject vehicle.

3. The method of claim 1, further comprising identifying the location of the subject vehicle relative to the secondary vehicle with at least one of a camera and radar mounted to the subject vehicle.

4. The method of claim 1, further comprising alerting the driver of the subject vehicle with at least one of a visual alert, an audible alert, and haptic feedback.

5. The method of claim 1, further comprising steering the subject vehicle away from the secondary vehicle if the gap is less than the predetermined distance.

6. The method of claim 1, further comprising alerting the driver of the subject vehicle of the secondary vehicle only when the turn signal of the subject vehicle indicating intent to enter the target lane is activated.

7. The method of claim 1, further comprising steering the subject vehicle away from the secondary vehicle using a lane change assist system.

8. The method of claim 1, further comprising steering the subject vehicle away from the secondary vehicle if the gap is less than a predetermined distance.

9. A system for informing a driver of a subject vehicle that the subject vehicle and a secondary vehicle may be entering a target lane between the subject vehicle and the secondary vehicle from opposite sides of the target lane, the system comprising:

a controller;

at least one sensor of the subject vehicle in communication with the controller, the at least one sensor being configured to identify a location of the subject vehicle relative to the secondary vehicle when the subject vehicle and the secondary vehicle are on opposite sides of the target lane, and when at least one of the subject vehicle and the secondary vehicle is moving into the target lane;

an alert system in communication with the controller, the alert system configured to alert the driver of the subject vehicle of the secondary vehicle when the subject and secondary vehicles are on opposite sides of the target lane, and when a gap between the subject and secondary vehicles is decreasing;

the at least one sensor is configured to identify activation of a turn signal of the secondary vehicle indicating intent to move the secondary vehicle into the target lane.

10. The system of claim 9, wherein the at least one sensor includes at least one of radar and a camera.

11. The system of claim 9, wherein GPS coordinates are used to identify location of the subject vehicle relative to the secondary vehicle.

12. The system of claim 9, wherein the alert system is configured to alert the driver of the subject vehicle that the turn signal of the secondary vehicle has been activated.

13. The system of claim 9, wherein the at least one sensor is configured to identify that the secondary vehicle is being steered into the target lane.

14. The system of claim 9, wherein the lane change assist system is configured to direct the subject vehicle away from the secondary vehicle by turning a steering wheel of the subject vehicle.

15. The system of claim 9, wherein the lane change assist system is configured to direct the subject vehicle away from the secondary vehicle by selectively braking wheels of the subject vehicle.

16. The system of claim 9, wherein the alert system is at least one of a visual alert, an audible alert, and a haptic alert.

17. The system of claim 9, wherein the at least one sensor activates only when the turn signal of the subject vehicle is activated indicating that the subject vehicle intends to enter the target lane.

18. The system of claim 9, further comprising a secondary vehicle alert system configured to generate an alert in the secondary vehicle when the gap is less than the predetermined distance.

19. The system of claim 9, wherein a lane change assist system configured to direct the subject vehicle away from the secondary vehicle when the gap is less than a predetermined distance.

20. A system for informing a driver of a subject vehicle that the subject vehicle and a secondary vehicle may be entering a target lane between the subject vehicle and the secondary vehicle from opposite sides of the target lane, the system comprising:

a controller;

at least one sensor of the subject vehicle in communication with the controller, the at least one sensor being configured to identify a location of the subject vehicle relative to the secondary vehicle when the subject vehicle and the secondary vehicle are on opposite sides of the target lane, and when at least one of the subject vehicle and the secondary vehicle is moving into the target lane;

an alert system in communication with the controller, the alert system configured to alert the driver of the subject vehicle of the secondary vehicle when the subject and secondary vehicles are on opposite sides of the target lane, and when a gap between the subject and secondary vehicles is decreasing; wherein the alert system is configured to distinguish between whether the secondary vehicle is in the target lane or on a side of the target lane opposite to the subject vehicle.

21. The system of claim 20, wherein a lane change assist system configured to direct the subject vehicle away from the secondary vehicle when the gap is less than a predetermined distance.

* * * * *